(12) United States Patent
Loringer et al.

(10) Patent No.: US 9,003,790 B2
(45) Date of Patent: Apr. 14, 2015

(54) TURBOCHARGER WITH IMPROVED CASING AND DIFFUSER AREAS

(75) Inventors: Daniel Edward Loringer, Erie, PA (US); Anthony Holmes Furman, Scotia, NY (US); Kendall Swenson, Eureka, CA (US); Dale William Ladoon, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 13/594,647

(22) Filed: Aug. 24, 2012
(Under 37 CFR 1.47)

(65) Prior Publication Data
US 2013/0052054 A1 Feb. 28, 2013

Related U.S. Application Data

(63) Continuation-in-part of application No. 12/354,623, filed on Jan. 15, 2009, now abandoned.

(51) Int. Cl.
| | | |
|---|---|---|
| F02B 37/22 | (2006.01) | |
| F02C 6/12 | (2006.01) | |
| F01D 9/02 | (2006.01) | |
| F02B 37/00 | (2006.01) | |

(52) U.S. Cl.
CPC . *F02C 6/12* (2013.01); *F01D 9/026* (2013.01); *F05D 2220/40* (2013.01); *F02B 37/00* (2013.01)

(58) Field of Classification Search
CPC ......... F02B 37/00; F02B 37/22; F02B 37/225
USPC .............. 60/598, 597; 415/207, 212.1, 224.2, 415/225, 226
See application file for complete search history.

(56) References Cited

U.S. PATENT DOCUMENTS

| | | | |
|---|---|---|---|
| 2,465,846 A | | 3/1949 | Clegern |
| 2,641,442 A | * | 6/1953 | Buchi ........................... 415/206 |
| 3,355,878 A | * | 12/1967 | Birmann ......................... 60/602 |
| 5,011,371 A | | 4/1991 | Gottemoller |
| 6,302,647 B1 | * | 10/2001 | Schueler et al. .............. 415/205 |
| 6,945,748 B2 | | 9/2005 | Svihla et al. |
| 8,328,506 B2 | | 12/2012 | Furman et al. |
| 2007/0283693 A1 | * | 12/2007 | Mulloy et al. .................. 60/598 |
| 2008/0229742 A1 | * | 9/2008 | Renaud et al. .................. 60/597 |

FOREIGN PATENT DOCUMENTS

| | | | | |
|---|---|---|---|---|
| EP | 1806489 A1 | | 7/2007 | |
| WO | 2004101977 A1 | | 11/2004 | |
| WO | WO 2004101977 A1 | * | 11/2004 | .............. F02D 23/02 |

OTHER PUBLICATIONS

European Patent Office, International Search Report of PCT/US2010/020627, May 6, 2010, Netherlands, 5 pages.
European Patent Office, Written Opinion of PCT/US2010/020627, May 6, 2010, Netherlands, 8 pages.

\* cited by examiner

*Primary Examiner* — Michael Andrews
(74) *Attorney, Agent, or Firm* — GE Global Patent Operation; John A. Kramer

(57) ABSTRACT

A turbocharger includes a compressor, a turbine, a shaft coupling the compressor to the turbine, and a turbo casing configured to improve pressure recovery and reduce energy loss from exhaust flow. In one embodiment, the turbo casing may include a geometry configured to improve exhaust flow towards an exhaust outlet. The turbo casing may include a torus shaped chamber having a cross-sectional area that progressively increases in an annular direction of the flow towards the exhaust outlet.

9 Claims, 11 Drawing Sheets

TURBOCHARGER WITH IMPROVED CASING AND DIFFUSER AREAS

FIELD

Embodiments of the subject matter disclosed herein relate to turbochargers and associated turbo casing geometries and components for improving the performance of turbochargers.

BACKGROUND

Turbochargers include a turbine and a compressor that may be connected by a shaft. The turbine is located in a turbine stage section of the turbocharger. The geometries and components in the turbine stage section are factors that may influence turbocharger efficiency and performance. In particular, geometries and components that affect exhaust flow, such as a turbo casing and diffuser, may allow an undesirable loss of energy from exhaust flow if not properly designed.

BRIEF DESCRIPTION

A turbocharger includes a compressor, a turbine, a shaft coupling the compressor to the turbine, and a turbo casing configured to improve pressure recovery and reduce energy loss from exhaust flow. In one embodiment, the turbo casing may include a geometry configured to improve exhaust flow towards an exhaust outlet. For example, the turbo casing may include a torus shaped chamber having a cross-sectional area that progressively increases in an annular direction of the flow towards the exhaust outlet. In another embodiment the turbocharger may include an exhaust diffuser comprising a bell mouth that extends into a first section of the turbo casing by a first protrusion distance, and into a second section of the turbo casing by a second protrusion distance. In another embodiment the turbo casing may be symmetrical about a vertical axis extending through the exhaust outlet. Advantageously, the particular geometries and configurations of the various embodiments disclosed herein may cooperate to improve exhaust flow through the turbocharger.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DRAWINGS

The present invention will be better understood from reading the following description of non-limiting embodiments, with reference to the attached drawings, wherein below:

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in more detail below, the various geometries and configurations of turbine stage components disclosed herein may be employed to reduce undesirable flow separations and corresponding reduced pressure performance and energy losses from restricted exhaust flow, and thereby improve turbocharger performance. In particular, an exhaust diffuser with a bell mouth portion may be added to the turbine stage, and a position of a rotor may be adjusted, thereby avoiding an increase in backpressure that may occur when modifying the diffuser. For example, a bell mouth may be added instead of a straight edge to extend a diffuser, along with a repositioning of the rotor disc closer to the inlet and transition section of the turbocharger, thereby improving pressure recovery as the exhaust flows out of the turbine stage. In some examples, the bell mouth may extend into a first section of a turbo casing in the turbine stage by a first protrusion distance, and into a second section of the turbo casing by a second protrusion distance. In addition, the turbo casing geometry may be configured to work in conjunction with the exhaust diffuser to improve pressure recovery, thereby increasing turbocharger efficiency. The embodiments discussed below improve turbocharger performance and efficiency by specifically configuring and positioning components in the turbine stage and exhaust path. It will be appreciated that the embodiments disclosed herein may apply to turbochargers, turbo machines, turbo expanders, turbines, and other turbine machinery.

Figure 1:
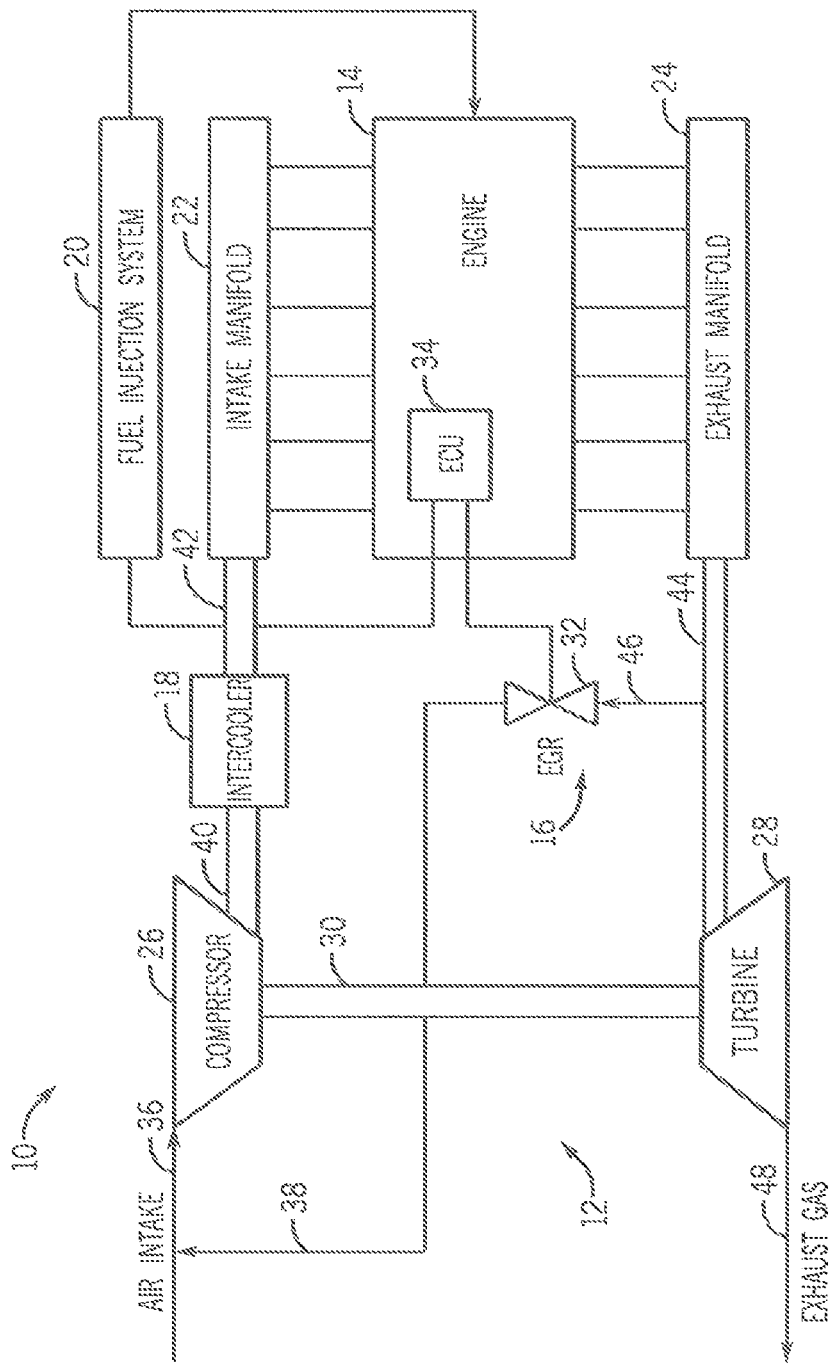
FIG. 1 is a block diagram of an embodiment of a system having an engine coupled to a turbocharger with an improved turbine stage according to one embodiment of the present disclosure.

FIG. 1 is a block diagram of a system 10 having a turbocharger 12 coupled to an engine 14, in accordance with certain embodiments of the present disclosure. The system 10 may be included in a vehicle, such as a locomotive, an automobile, a bus, or a boat. Alternatively, the system 10 may be included a stationary system, such as a power generation system having the engine 14 coupled to a generator. The illustrated engine 14 may be a compression-ignition engine, such as a diesel engine. However, other embodiments of the engine 14 may include a spark-ignition engine, such as a gasoline-powered internal combustion engine.

Figure 3:
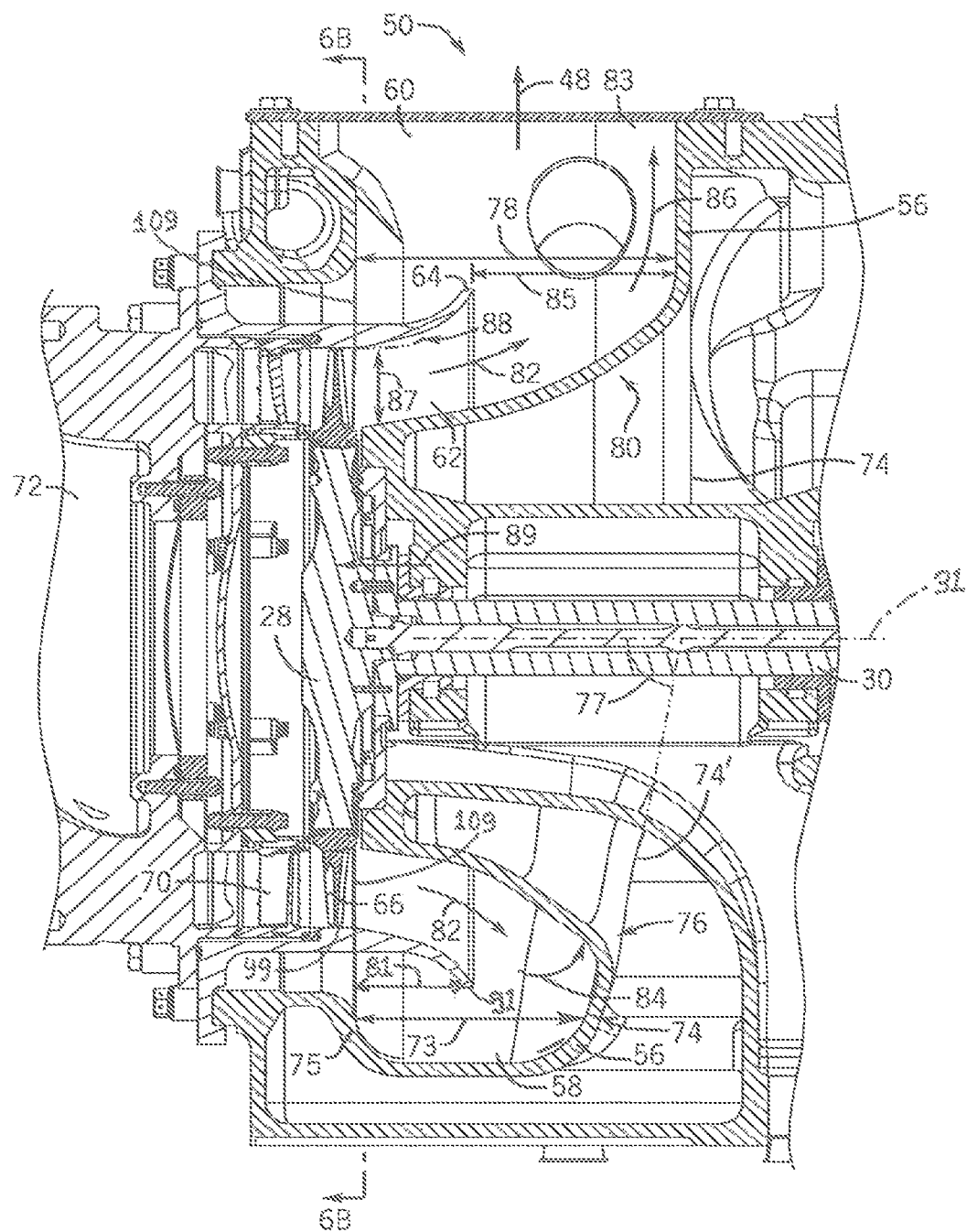
FIG. 3 is a detailed cutaway side view, approximately to scale, of an embodiment of an improved turbine stage, as illustrated in FIG. 2.

As illustrated, the system 10 includes an exhaust gas recirculation (EGR) system 16, an intercooler 18, a fuel injection system 20, an intake manifold 22, and an exhaust manifold 24. With reference also to FIG. 3, the illustrated turbocharger 12 includes a compressor 26 coupled to a turbine 28 via a drive shaft 30 having an axis 31. The EGR system 16 may include an EGR valve 32 disposed downstream from the exhaust manifold 24 and upstream from the compressor 26. In addition, the system 10 includes a controller 34, e.g., an electronic control unit (ECU), coupled to various sensors and devices throughout the system 10. For example, the illustrated controller 34 is coupled to the EGR valve 32 and the fuel injection system 20. However, the controller 34 may be coupled to sensors and control features of each illustrated component of the system 10, among many others.

As illustrated in FIG. 1, the system 10 intakes air into the compressor 26 as illustrated by arrow 36. In addition, as discussed further below, the compressor 26 may intake a portion of the exhaust from the exhaust manifold 24 via control of the EGR valve 32 as indicated by arrow 38. In turn, the compressor 26 compresses the intake air and a portion of the engine exhaust and outputs the compressed gas to the intercooler 18 via a conduit 40. The intercooler 18 functions as a heat exchanger to remove heat from the compressed gas as a result of the compression process. As it will be appreciated, the compression process typically heats up the intake air, and thus the compressed gas is cooled prior to intake into the intake manifold 22. As further illustrated, the compressed and cooled gas passes from the intercooler 18 to the intake manifold 22 via conduit 42.

The intake manifold 22 then routes the compressed gas into the engine 14. The engine 14 compresses this gas within various piston cylinder assemblies such as, for example, 4, 6, 8, 10, 12, or 16 piston cylinder assemblies. Fuel from the fuel injection system 20 is injected directly into engine cylinders. The controller 34 may control the fuel injection timing of the fuel injection system 20, such that the fuel is injected at the appropriate time into the engine 14. The heat of the compressed gas ignites the fuel as each piston compresses a volume of gas within its corresponding cylinder.

In turn, the engine 14 exhausts the products of combustion from the various piston cylinder assemblies through the exhaust manifold 24. The exhaust from the engine 14 then passes through a conduit 44 from the exhaust manifold 24 to the turbine 28. In addition, a portion of the exhaust may be routed from the conduit 44 to the EGR valve 32 as illustrated by arrow 46. At this point, this portion of the exhaust passes to the air intake of the compressor 26 as illustrated by the arrow 38, as mentioned above. The controller 34 controls the EGR valve 32, such that a suitable portion of the exhaust is passed to the compressor 26 depending on various operating parameters and/or environmental conditions of the system 10. As depicted, the exhaust gas drives the turbine 28, such that the turbine rotates the shaft 30 and drives the compressor 26. The exhaust gas then passes out of the system 10 and particularly the turbine 28, as indicated by arrow 48. As compressor 26 is driven, additional air intake occurs, thereby improving performance, power density, and efficiency in the engine by providing additional air for the combustion process.

As will be discussed in more detail below, optimization and modification of certain components in the turbine stage portion of the turbocharger 12 may reduce energy loss and improve performance of the turbocharger 12. For example, the disclosed embodiments may include a modified configuration of a turbo casing of the turbocharger 12 to reduce exhaust flow separation and thereby improve exhaust flow, to a muffler for example, and improve overall turbocharger efficiency. In addition, the arrangement and design of the exhaust diffuser and axial location of the turbine stage improve pressure recovery within the turbine stage, further enhancing exhaust flow and system efficiency through reduced back pressure on the engine. The disclosed embodiments also improve turbocharger performance across various conditions, including during both high and low speed operation. Further, these enhancements improve performance and fuel efficiency of the turbocharger system and engine.

Figure 2:
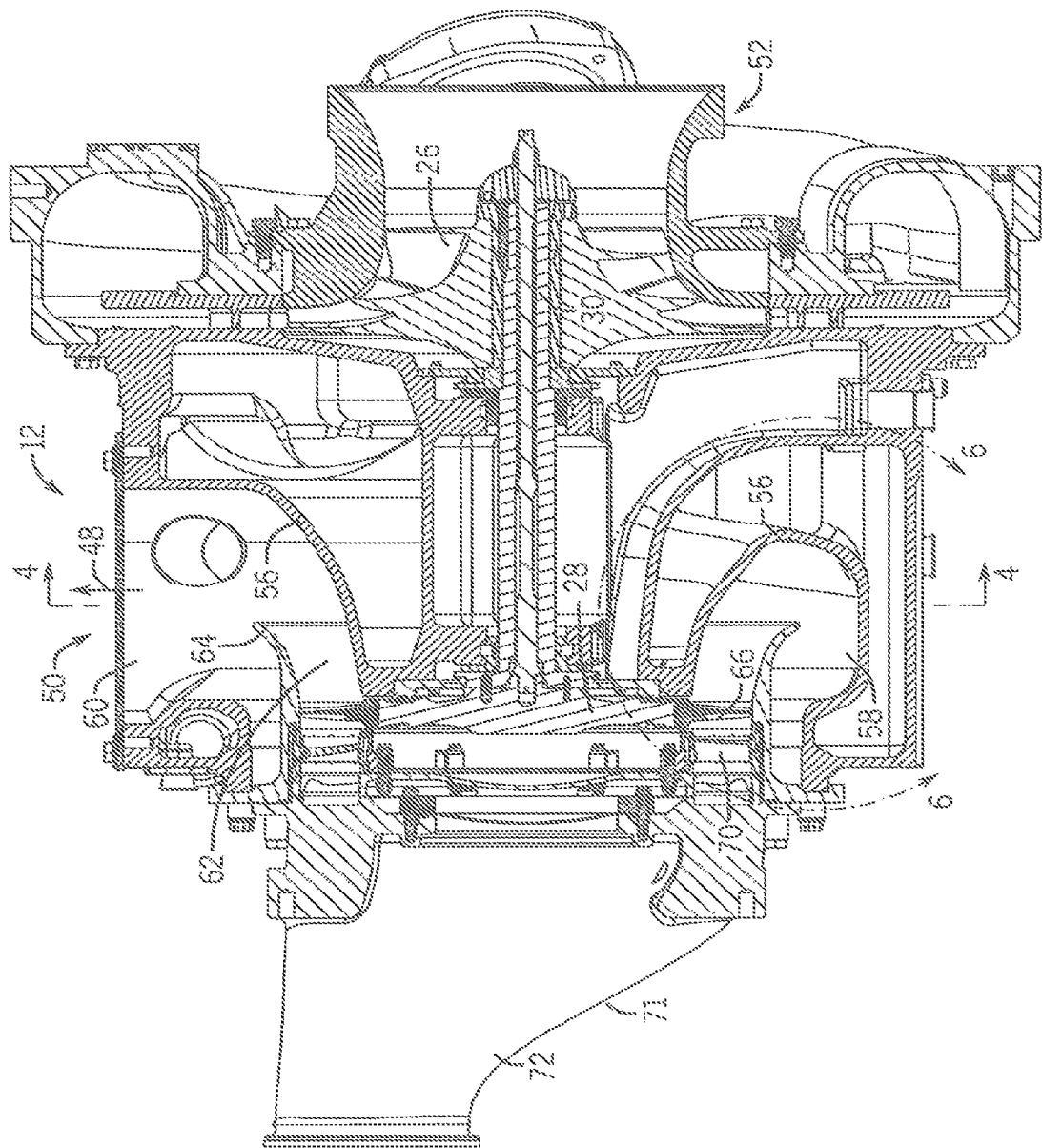
FIG. 2 is a cutaway side view, approximately to scale, of an embodiment of a turbocharger having an improved turbine stage.

FIG. 2 is a sectional side view of an embodiment of improved turbocharger 12. In this embodiment, turbine stage portion 50 includes several components and modifications that improve efficiency and performance of the turbocharger 12. As depicted, compressor end 52 includes compressor 26 (e.g., compressor blades), which is attached to shaft 30 and turbine 28 (e.g., turbine blades). In this arrangement, the rotation of turbine 28 causes compressor 26 to rotate, thereby compressing air within the turbocharger 12 to increase air density for the intake manifold 22.

In this embodiment, a turbo casing 56 encompasses a cavity which may be described as torus shaped, and allows exhaust to flow toward and exit an upper section 60, as depicted by arrow 48. Turbocharger exhaust may flow inside turbo casing 56 and be directed from lower section 58 toward an exhaust outlet 83 in the upper section 60 (see also FIG. 3). Exhaust may be routed into turbo casing 56 by exhaust diffuser 62, which features a bell mouth 64 having a curve shaped cross-section. As described in more detail below, the particular geometry of the bell mouth 64 in cooperation with the geometry of the turbo casing 56 may enhance exhaust flow and improve pressure recovery in turbocharger 12. For example, exhaust flow from diffuser 62 may encounter less resistance as it flows toward exhaust outlet 83 and upper section 60, thereby improving performance and efficiency.

Turbine buckets 66 may be radially located on turbine 28, thereby rotating the turbine 28 as exhaust flows through the buckets 66. Exhaust may flow through nozzle ring 70 en route to bucket 66 and turbo casing 56. Exhaust may enter a portion of turbocharger 12 via transition section 72, which may be optimized to enhance exhaust flow of the improved turbocharger design 12. In an exemplary embodiment, transition section 72 may have a curvature configured to reduce flow separation of the flow entering turbocharger 12. For example, transition section 72 may have two inlets having walls 71 that gradually curve inward, rather than being abruptly angled, to reduce the likelihood of flow separation. Turbocharger exhaust may flow through optimized transition section 72, nozzle ring 70, buckets 66, exhaust diffuser 62, and turbo casing 56, thereby driving rotation of turbine rotor 28 and flowing exhaust through the improved exhaust diffuser 62 and turbo casing 56. FIG. 2 also includes sectional lines 4 that illustrate a sectional plane used in FIG. 4.

Figure 6A:
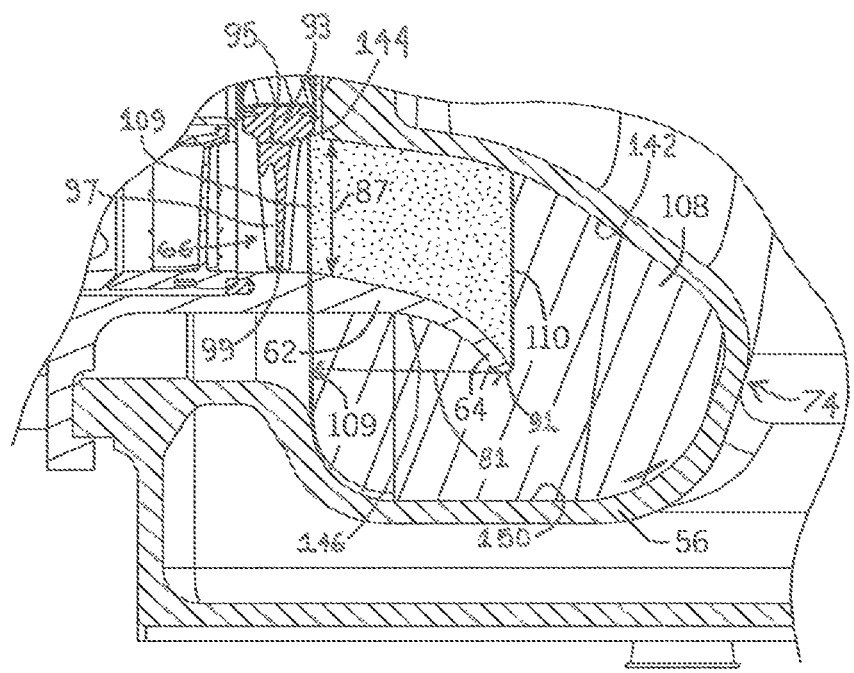
FIG. 6A is a detailed cutaway side view, approximately to scale, of an embodiment of a turbo casing of an improved turbocharger, illustrating cross sectional areas of an exhaust diffuser and a turbo casing.

FIG. 3 is a detailed sectional side view of an embodiment of turbocharger 12, as shown in FIG. 2. As depicted, turbine stage portion 50 has several improvements that are designed to improve turbocharger performance and enhance exhaust flow through exhaust diffuser 62 and turbo casing 56. With reference also to FIG. 6A, in this embodiment the cavity enclosed by turbo casing 56 may include an axial or lateral cavity distance that may vary in an annular direction from the lower section 58 to the upper section 60, and may vary with the circumferential location within the torus shaped turbo casing 56. The axial cavity distance may be defined as a distance between a line 109 and an interior casing wall 74 of the turbo casing 56 that is opposite to the line 109. With reference to FIGS. 3 and 6A and bucket 66, line 109 extends radially from a leading edge 144 of a bucket base 93 of the bucket 66, and is substantially perpendicular to an axis 31 of the shaft 30. The bucket base 93 may have a distal portion 95 from which a flow receiving portion 97 extends to a tip 99. The bucket 66 also has a radial bucket height 87 as indicated in FIGS. 3 and 6A. As illustrated in FIG. 6A, the radial bucket height 87 may be defined as the radial distance between the bucket tip 99 and the distal portion 95 of the bucket base 93.

As noted above, the axial cavity distance within the cavity of the torus shaped turbo casing 56 may vary from the lower section 58 to the upper section 60 with the circumferential location within the turbo casing. For example, a lower turbo casing cross section geometry 76 may be characterized by an axial cavity distance that progressively increases from the lower section 58 toward the upper section 60. Accordingly, a lower section turbo casing geometry 76 may be different from an upper section turbo casing geometry 80. In this manner and as illustrated in FIG. 3, the turbo casing 56 may include a first axial cavity distance 73 in the lower section 58 and a second axial cavity distance 78 in the upper section 60. In accordance with a progressive increase from the lower section 58 to the upper section 60, the first axial cavity distance 73 may be less than the second axial cavity distance 78.

To create such a progressive increase, the interior casing wall 74 of the turbo casing 56 may progressively expand in an axial direction away from opposing turbine 28 in a direction of the exhaust flow from lower section 58 to upper section 60. Advantageously, and as explained in more detail below, such a configuration provides desirable guidance of exhaust flow towards exhaust outlet 83 at the smaller, lower section 58, while also providing increasing cross-sectional area towards the exhaust outlet to accommodate additional exhaust exiting the diffuser 62 along other portions of the turbine 28.

With continued reference to FIG. 3, in one aspect of an improved geometry of the turbo casing 56, a lower portion 74' of the interior casing wall 74 in the lower section 58 of the turbo casing may form an angle 77 of about 75 to 80 degrees relative to the axis 31 through the shaft 30. Advantageously, orienting the lower portion 74' of the casing wall 74 in this manner, in cooperation with the configuration and other features of the turbine stage portion 50 described herein, enables desirable guidance of the exhaust flow towards outlet 83 while minimizing flow separation and corresponding pressure losses in the lower section 58.

Turbocharger exhaust may flow through buckets 66 and exhaust diffuser 62, as indicated by arrows 82, into turbo casing 56. In lower section 58, exhaust flow may be routed upwardly toward an exhaust outlet 83, as indicated by arrow 84. Exhaust may flow from direction 84 to direction 86 toward the exhaust outlet 83. As noted above, the turbo casing geometry 80 of upper section 60 includes a second axial cavity distance 78 that is greater than the first axial cavity distance 73 in the lower section 58. With this configuration, the larger second axial cavity distance 78 enables improved exhaust flow and reduced flow attachment in the upper section 60, thereby further improving turbocharger efficiency.

With continued reference to FIGS. 3 and 6A, in one embodiment a length of the bell mouth 64 extending in an axial direction into the torus shaped cavity may be defined as a bell mouth axial distance 81 from the tip 91 of the bell mouth 64 to the line 109 extending radially away from the leading edge 144 of bucket base 93. For example, bell mouth axial distance 81 may be about 7.6 cm to about 17.8 cm. In an exemplary embodiment, bell mouth 64 of exhaust diffuser 62 may be shaped and positioned to improve pressure recovery in turbocharger 12. In some examples, the bell mouth axial distance 81 may be constant around a circumference of the bell mouth.

With continued reference to FIG. 3, a protrusion distance may be defined as the axial cavity distance minus the bell mouth axial distance at a given location along the torus shaped chamber. It will be appreciated that the protrusion distance may correspond to a measure of protrusion of the bell mouth 64 into the torus shaped cavity. In some examples, the protrusion distance may vary between about 30% to about 50% of the axial cavity distance around the circumference of the bell mouth.

As illustrated in FIG. 3, in one example the bell mouth 64 extends into the lower section 58 of the turbo casing 56 in a direction parallel to the axis 31 of the shaft 30 by a first protrusion distance (first axial cavity distance 73—bell mouth axial distance 81) that is about 50% of the first axial cavity distance 73. Turning to the upper section 60 of the turbo casing 56, the bell mouth extends into the upper section in the direction parallel to the axis 31 of the shaft 30 by a second protrusion distance (second axial cavity distance 78—bell mouth axial distance 81) that is about 30% of the second axial cavity distance 78. Additionally, the protrusion distance of the bell mouth 64 may progressively decrease from the lower section 58 to the upper section 60. Advantageously, by reducing the protrusion distance of the bell mouth 64 from the lower section 58 to the upper section 60, additional volume is made available for incoming exhaust flow around the torus shaped chamber to reduce backpressure effects and flow separation issues. Additionally, by providing a second protrusion distance in the upper section that is about 30% of the second axial cavity distance 78, additional volume is created near the exhaust outlet 83 to accommodate a greater volume of exhaust flow in this region.

In some examples, two or more features of the turbine stage 50 may cooperate to enable improved pressure recover, decreased flow separation, and other advantages of the present disclosure. In one embodiment, the bell mouth axial distance 81 and radial bucket height 87 may be designed to cooperate to achieve such advantages. For example, the inventors have discovered that a ratio of the bell mouth axial distance 81 to the radial bucket height 87 of between about 1.4 to about 3.4 may provide one or more of such advantages.

FIG. 3 also includes dashed lines depicting an alternate exhaust diffuser profile 88, which may be described as a flat diffuser profile, as compared to the curved cross section of the bell mouth 64 of diffuser 62, which may increase turbocharger efficiency. It will be appreciated that the improvements illustrated in turbine stage portion 50, including an expanding cross sectional area of turbo casing 56 toward an exhaust flow outlet 83, as described in more detail below, as well as bell shaped exhaust diffuser 62, may lead to improved turbocharger efficiency and performance. In this manner, such improvements may facilitate corresponding reductions in fuel consumption and emissions. Additionally, in some embodiments the turbine rotor 28 may be shifted axially outward in direction 89, thereby increasing the length of shaft 30 by about 15-20% to further enhance the beneficial effects of exhaust diffuser 62 and turbo casing 56 improvements.

With continued reference to the embodiment illustrated in FIG. 6A, as noted above the torus shaped chamber has a cross-sectional area that progressively increases from the lower section 58 to the upper section 60. In the embodiment shown in FIG. 6A, the sectional view of lower section 58 is taken 180 degrees from vertical axis 101 of FIG. 4. At this point, turbo casing 56 may encompass a cross-sectional 108 area that may be referred to as the turbo casing area. In one example, the cross sectional area 108 may be defined as an area bounded by a line 110 extending radially from the tip 91 of the bell mouth 64 toward the shaft 30 to a first location along the interior casing wall 74 opposite to the tip, by the portion of line 109 extending radially from a surface 146 of the bell mouth to a second location along the interior casing wall 74, by the surface 146 of the bell mouth extending between the line 109 and the tip 91 of the bell mouth, and by portions 142, 150 of an interior casing wall surface of interior casing wall 74 extending between the line 110 and the line 109.

Figure 4:
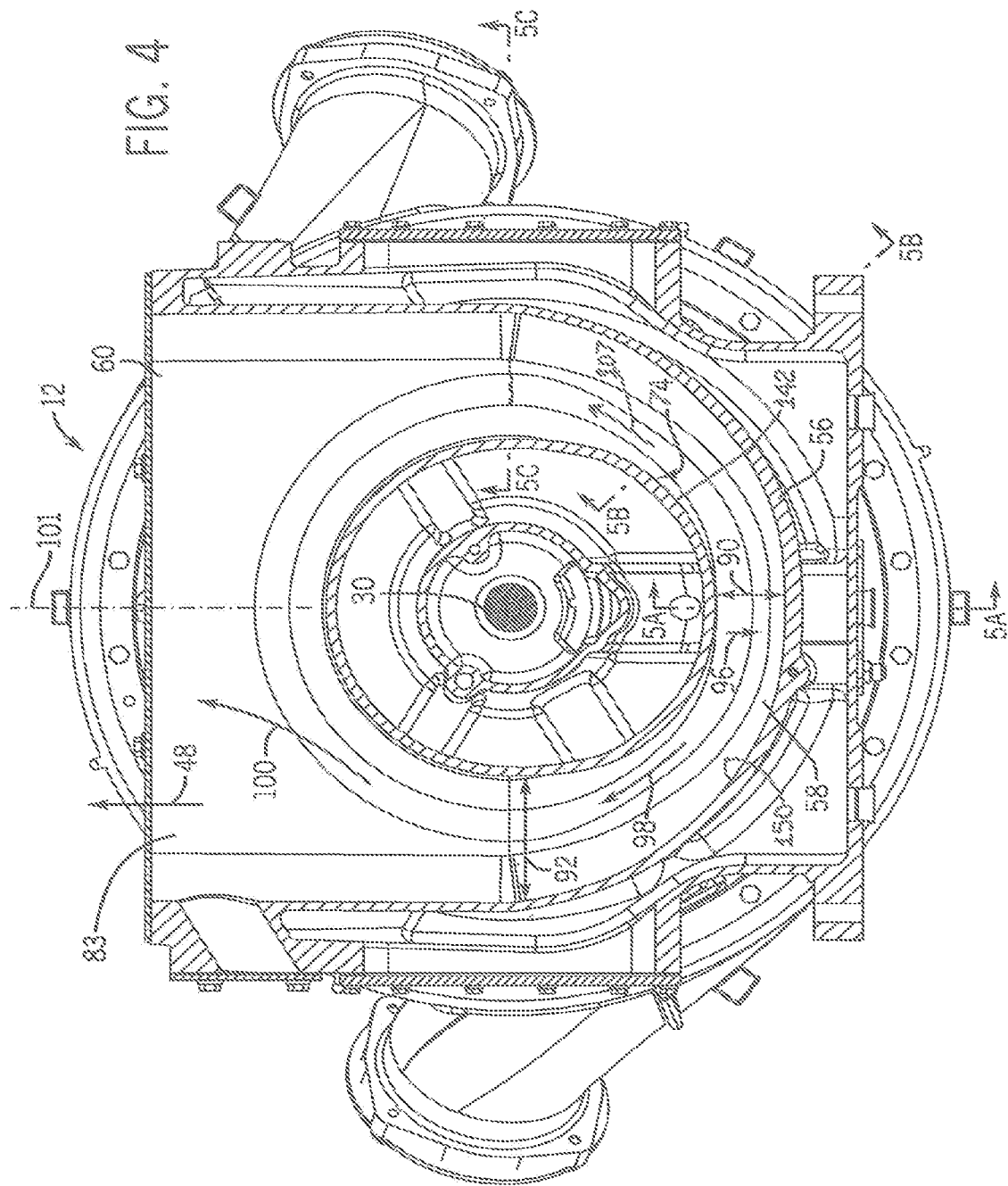
FIG. 4 is a cutaway end view, approximately to scale, of an embodiment of a turbocharger having an improved turbine stage, as illustrated in FIG. 2.

Advantageously, to achieve one or more of the advantages described herein, the cross-sectional area 108 of the torus-shaped chamber may progressively increase by at least about 40 percent from a center of the lower section 58 in about the first 90 degrees in an annular direction toward the exhaust outlet 83. With reference now to FIG. 4, the center of the lower section 58 may be defined as a location about 180 degrees from a vertical axis 101 that extends from the center of the shaft 30 through the outlet 83. Alternatively expressed, the cross sectional area 108 of the torus shaped chamber may increase by at least about 40 percent from about the 180 degree position relative to axis 101 to about the 270 degree position in an annular direction toward the exhaust outlet 83. Additionally, and as explained in more detail below with reference to FIG. 4, in some embodiments the turbo casing 56 may be symmetrical about the vertical axis 101. In such embodiments, the cross sectional area 180 of the torus shaped chamber may increase by at least about 40 percent from about the 180 degrees position to about the 270 degree position in both the clockwise and the counterclockwise direction.

FIG. 4 is a sectional end view of an embodiment of an improved turbocharger 12, as shown in FIG. 2. In this embodiment, turbo casing 56 is configured to direct exhaust flow toward an exhaust outlet 83. In this embodiment, the turbo casing 56 has an interior geometry that varies from lower section 58 to upper section 60, e.g., area scheduling of the cross section of the cavity within turbo casing 56. As illustrated in FIG. 4, the interior casing wall 74 may have a first interior casing wall surface 142 and an opposing second interior casing wall surface 150. A first radial cavity distance 90 may be measured between the opposing surfaces 142, 150 of the interior casing wall 74 at a first location about 180 degrees from the vertical axis 101 that extends from a center of the shaft through the exhaust outlet 83. A second radial cavity distance 92 may also be measured between the first interior casing wall surface 142 and the opposing second interior casing wall surface 150 at a second location about 90 degrees from the vertical axis 101. As illustrated in FIG. 4, the first radial cavity distance 90 is less than the second radial cavity distance 92. In this manner, the cross sectional area at the location where radial cavity distance 90 is measured may be at least approximately 30-50% less than the cross sectional area at the location where radial cavity distance 92 is measured. Accordingly, the volume within the turbo casing cavity expands toward an exhaust outlet 83 located near upper section 60, improving and enhancing performance and efficiency of turbocharger 12.

As illustrated in FIG. 4, in one embodiment the turbo casing 56 may be symmetrical about the vertical axis 101. In this manner, for example, a radial cavity distance at a location 180 degrees from radial cavity distance 92 may be substantially the same as radial cavity distance 92. Alternatively expressed, the cross-sectional area of the turbo casing 56 may symmetrically increase in both the clockwise and the counterclockwise directions from the first location in the lower section 58 at about 180 degrees from vertical axis 101. Advantageously, in this embodiment the symmetry of the turbo casing 56 about the vertical axis 101 may promote symmetrical flow throughout the casing to thereby further reduce pressure losses, flow separations and related flow disturbances.

As depicted, a change in the geometry of turbo casing wall 74 reflects the change in cross section area of the turbo casing 56. In addition, exhaust may flow from exhaust diffuser 62 downward into turbo casing 56, as shown by arrow 96. Turbo casing 56 may then route the exhaust flow in circumferential directions 98 and 107 toward upper section 60, wherein the volume within the turbo casing 56 expands in the direction of exhaust flow. Finally, exhaust may flow through upper section 60, as indicated by arrow 100, wherein the volume within turbo casing 56 is much larger than the volume of turbo casing 56 near lower section 58. Cross section lines 5A-5A, 5B-5B, and 5C-5C illustrate the planes used to create sectional views of turbo casing 56 to depict circumferential views of geometries within turbocharger 12. Specifically, line 5A-5A may be described as at a 180 degree angle to vertical axis 101, line 5B-5B may be described as at a 135 degree angle to vertical axis 101, and line 5C-5C may be described as at a 90 degree angle to vertical axis 101.

Figure 5A:
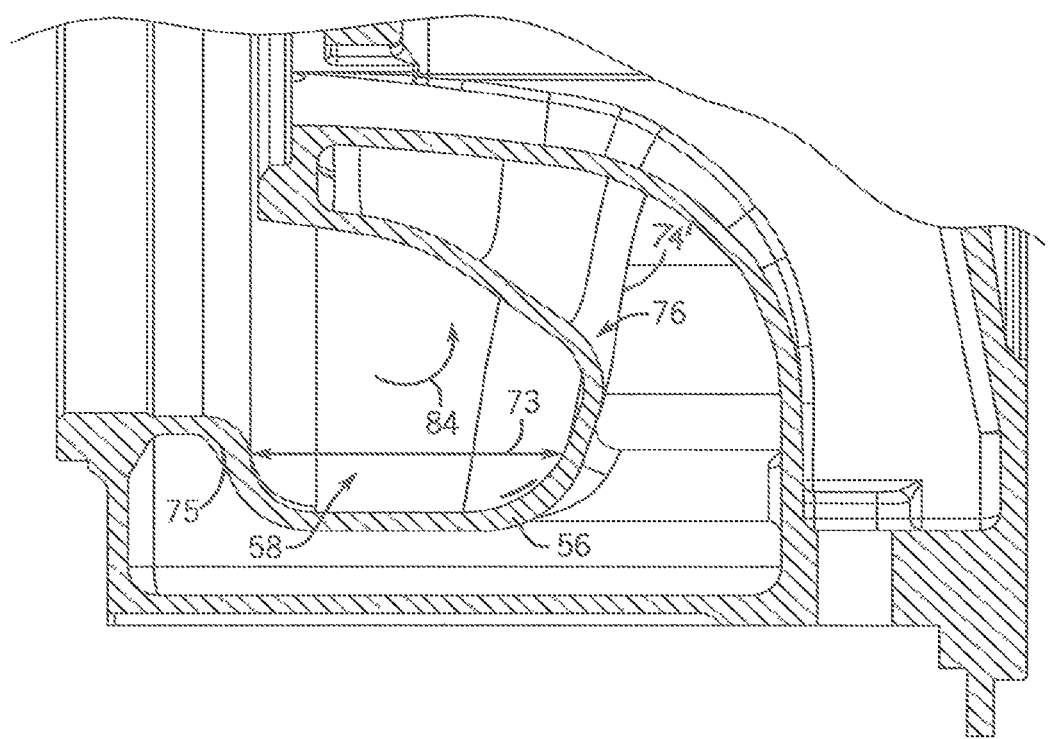
FIG. 5A is a detailed cutaway side view, approximately to scale, of an embodiment of a turbo casing of an improved turbocharger taken along line 5A-5A of FIG. 4.

FIG. 5A is a detailed cutaway side view of an embodiment of turbo casing 56 taken along line 5A-5A of FIG. 4. In this embodiment, turbo casing 56 has a smaller cross sectional area in lower section 58 as compared to upper section 60 of the turbocharger 12. Accordingly, distance 73 between casing walls may be less than in portions of the turbo casing 56 located near the exhaust outlet 83. In addition, lower turbo casing geometry 76 is different than upper turbo casing geometry 80 as, for example, the orientation of the lower portion 74' of the interior casing wall 74 changes toward the exhaust outlet 83. Further, as previously described, exhaust may flow from an exhaust diffuser 62 outward and downward within the turbo casing 56 and may be redirected by the geometry 76 toward the exhaust outlet 83.

Figure 5B:
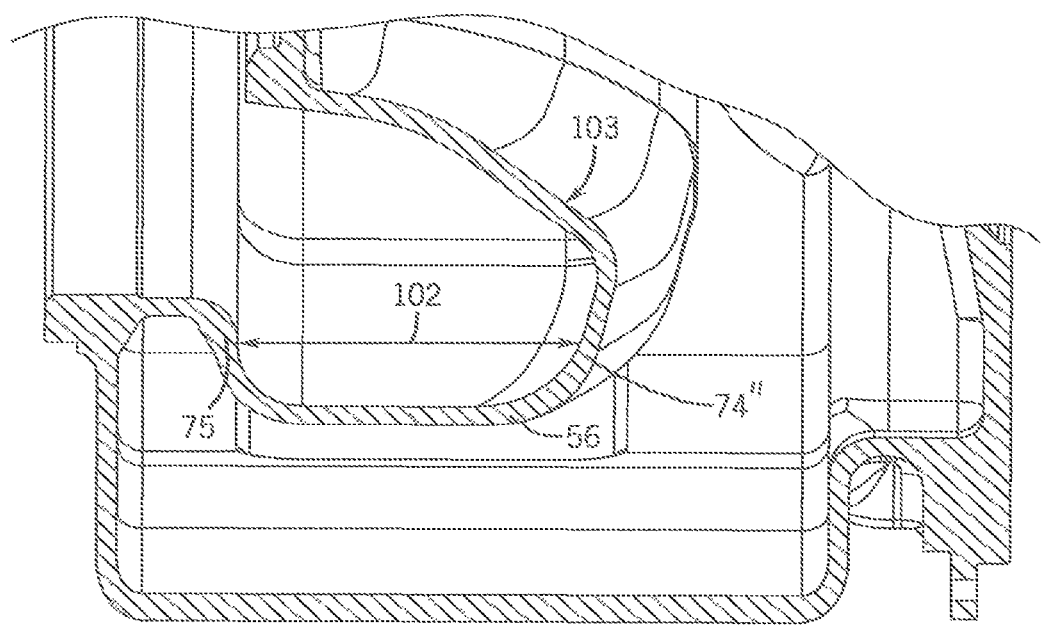
FIG. 5B is a detailed cutaway side view, approximately to scale, of an embodiment of a turbo casing of an improved turbocharger taken along line 5B-5B of FIG. 4.

FIG. 5B is a detailed cutaway side view of an embodiment of turbo casing 56 taken along line 5B-5B of FIG. 4. As depicted, the sectional view is taken at a plane that is about 45 degrees relative to the sectional plane view of FIG. 5A. In the embodiment, turbo casing 56 has a larger cross sectional area than the cross section in lower section 58. A mid portion 74" of interior casing wall 74 may be oriented to be closer to normal with respect to the axis 31 of shaft 30 as compared to the lower portion 74'. The axial cavity distance 102 between casing walls may also be larger than the axial cavity distance 73 in lower section 58. The area scheduling of the cavity within turbo casing 56 at this location is achieved in part by the orientation of mid portion 74' of internal wall casing 74 and by the wall geometry 103, which improves exhaust flow.

Figure 5C:
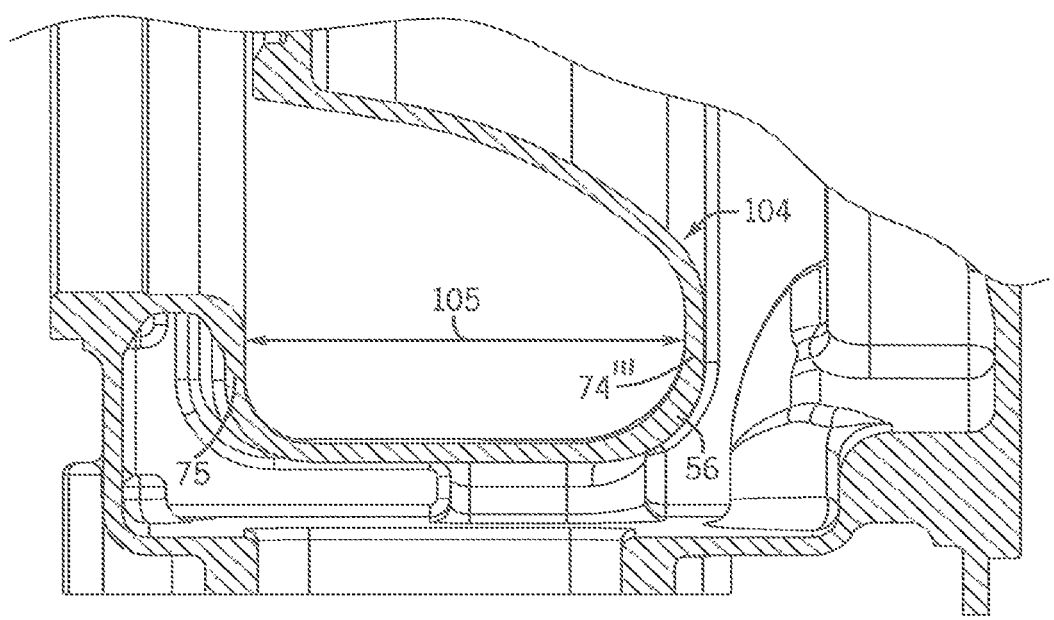
FIG. 5C is a detailed cutaway side view, approximately to scale, of an embodiment of a turbo casing of an improved turbocharger taken along line 5C-5C of FIG. 4.

FIG. 5C is a detailed cutaway side view of an embodiment of turbo casing 56 taken along line 5C-5C of FIG. 4. As depicted, the sectional view is taken at a plane that is about 90 degrees, or perpendicular in orientation to, the sectional plane view of FIG. 5A. In this embodiment, turbo casing geometry 104 may be configured to enhance an exhaust flow through the turbo casing 56 by expanding the turbo casing cavity as the exhaust flows toward the exhaust outlet 83. An upper portion 74''' of interior casing wall 74 may be oriented to be substantially normal with respect to the axis 31 of shaft 30. As such, axial cavity distance 105 may be larger than axial cavity distances 102 and 73 (from FIGS. 5B and 5A). It will be appreciated that this embodiment of turbo casing 56 and improved turbine stage portion 50 includes improved geometry and component orientations to enable enhanced turbocharger 12 performance, improved efficiency, improved exhaust flow, and reduced back pressure in the turbocharger.

Figure 6B:
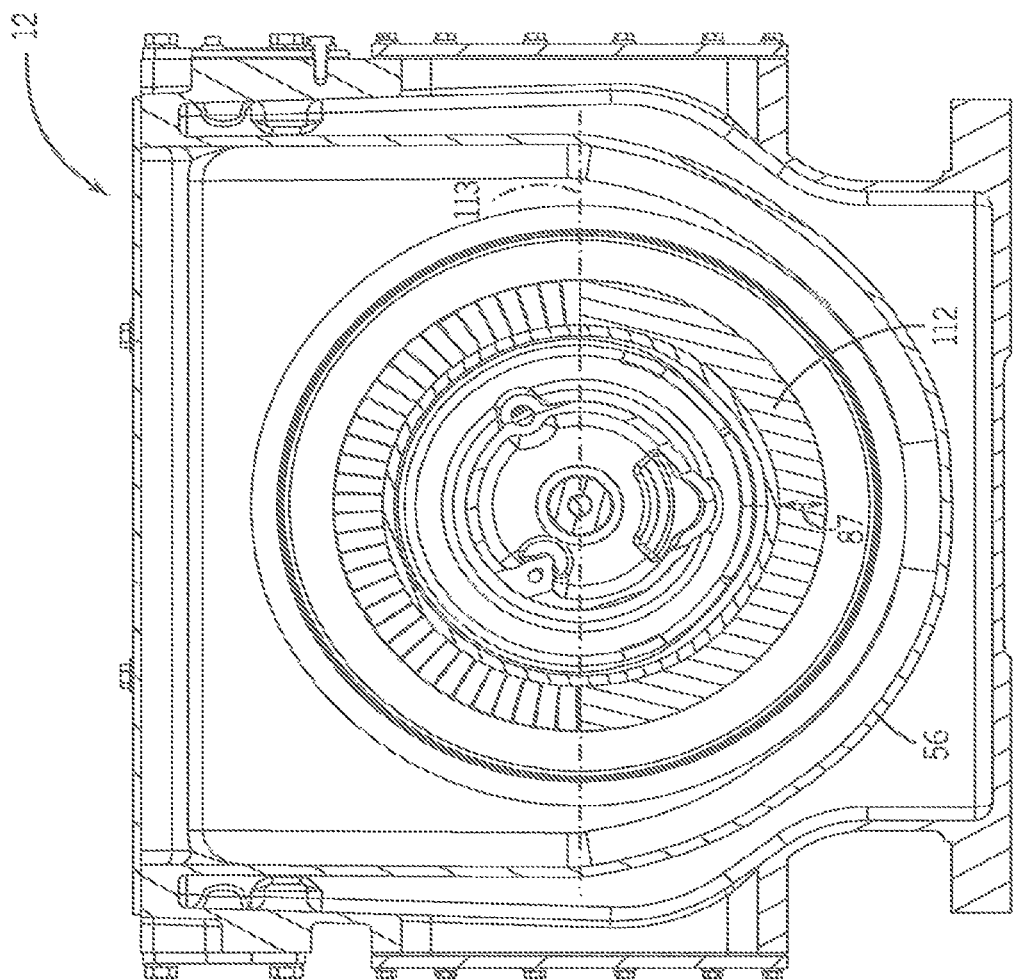
FIG. 6B is a cutaway end view, approximately to scale, of an embodiment of a turbocharger having an improved turbine stage.

As noted above, FIG. 6A is a detailed sectional side view of an embodiment of turbo casing 56 of an improved turbocharger 12. FIG. 6B is a sectional end view of an embodiment of an improved turbocharger 12. Areas shown in FIGS. 6A and 6B illustrate areas that are included in a ratio of an exhaust hood or turbine casing area to a diffuser inlet annulus area 112 illustrated in FIG. 6B.

As illustrated in FIG. 6B, the diffuser inlet annulus area 112 may be defined as the radial bucket height 87 swept annularly along the semicircular travel of one of the turbine blades from a first location at an axial line 113 extending through axis 31 of the shaft 30 to a second location at the axial line 113 that is 180 degrees from the first location. As shown in FIG. 6B, in one example the diffuser inlet annulus area 112 may be substantially constant around the circumference of the diffuser 62. As depicted, the diffuser inlet annulus area 112 is the inlet annulus area below the line 113 that is in the center of the inlet annulus. Cross sectional area 108 and diffuser inlet annulus area 112 may be used to illustrate the area scheduling that improves exhaust flow within turbine stage portion 50.

As noted above the geometry and cross sectional area 108 of turbo casing 56 change through the circumference of the torus shaped cavity. Further, in an exemplary embodiment, the diffuser 62 geometry and diffuser inlet annulus area 112 illustrated by the sectional view of FIG. 6B may be uniform throughout the circumference of the torus shaped cavity. Accordingly, a ratio of the turbo casing cross-sectional area 108 to diffuser inlet annulus area 112, taken throughout the circumference of the turbocharger 12, may be useful in illustrating the improved efficiency and flow characteristics of one embodiment of the turbo casing 56. In one example, the gradual increase of the turbo casing cross sectional area 108 in the direction of exhaust flow towards outlet 83 may be described as a non-symmetrical geometry of turbo casing 56, leading to the improvements discussed herein. The ratios of areas throughout the circumference of turbocharger 12 are illustrated in chart form in FIG. 7.

Figure 7:
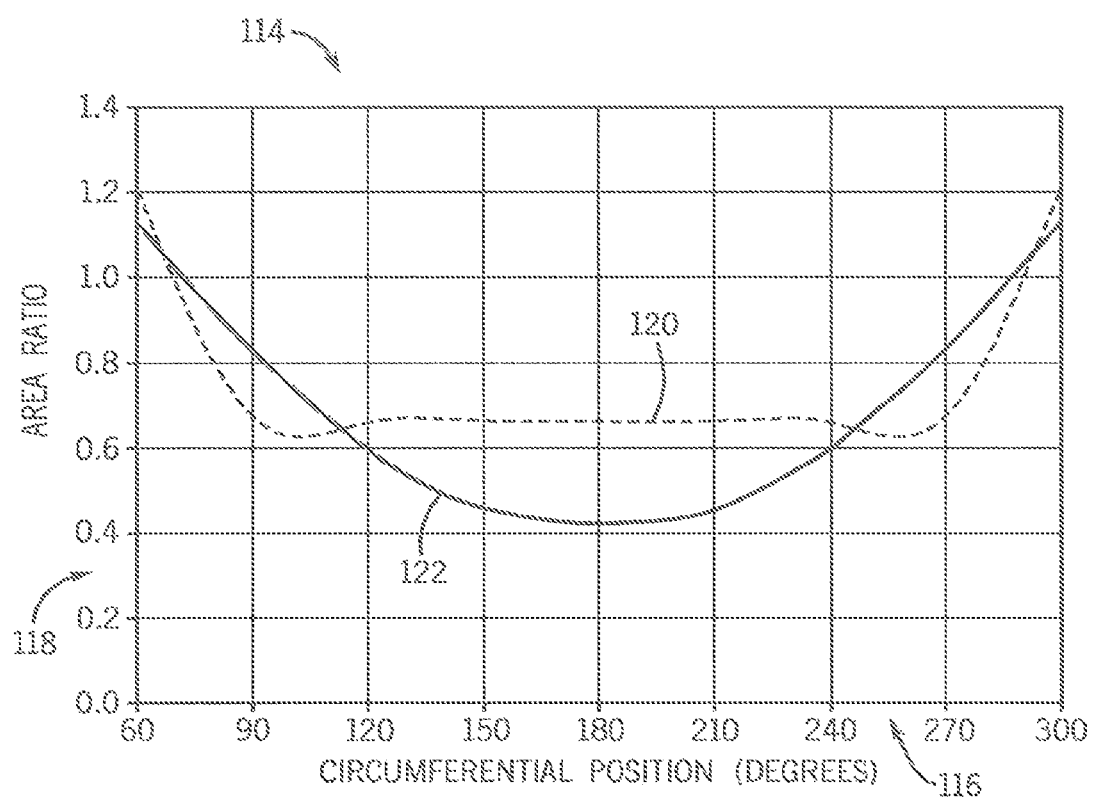
FIG. 7 is a chart of the circumferential positions within two turbochargers plotted against a ratio of cross sectional areas of the turbo casing and the exhaust diffuser, as shown in FIGS. 6A and 6B.

Specifically, FIG. 7 is a chart illustrating the above-described area ratios (e.g., cross sectional area 108 to diffuser inlet annulus area 112) as they relate to a circumferential position where the section plane is located within turbocharger 12. As depicted, the chart 114 plots a circumferential position wherein the cross sectional area 108 of the turbo casing 56 is taken at various sectional planes through turbocharger 12 as illustrated in FIG. 4. Further, the ratio of the turbo casing cross sectional area 108 to the diffuser inlet annulus area 112 is illustrated along axis 118. The ratio plotted in chart 114 is the turbo cross-sectional area 108 at each cross section along the circumference of the turbocharger 12 divided by the constant diffuser inlet annulus area 112. Line 120 is a plot of area ratio data from a turbocharger stage portion that does not feature the improved turbo casing design of the present disclosure, and therefore has a less gradual change in cross sectional area (108 in FIG. 6A), which can cause significant flow losses. Line 122 illustrates the area ratio (e.g., cross sectional area 108 to diffuser inlet annulus area 112) of the turbocharger of the present disclosure, and the corresponding gradual change of turbine casing cross sectional area as plotted against the position within the turbocharger 12 relative to vertical axis 101. It will be appreciated that the diffuser inlet annulus area 112 is a constant value for both lines 120 and 122.

As depicted, the circumferential position 116 (e.g., horizontal axis) comprises data points taken between the 60 degree plane and the 300 degree plane at 30 degree intervals relative to a plane through vertical axis 101 (FIG. 4). For example, in the chart 114 the 60 degree data points are a ratio of area measurements taken through a plane about 60 degrees in a clockwise direction relative to a plane through vertical axis 101. The 90 degree data points are a ratio of area measurements taken through a plane about 90 degrees in a clockwise direction relative to the plane through vertical axis 101. The data points at 300 degrees are area measurements taken through a plane at about 300 degrees in a clockwise direction relative to the plane through vertical axis 101. As shown, the gradual change in area ratio (e.g., cross sectional area 108 to diffuser inlet annulus area 112) within the turbo casing 56 that is provided by the turbocharger of the present disclosure, shown by line 122, allows for a gradual volume expansion and therefore a smoother flow of exhaust through the turbo casing, thereby improving flow and turbocharger performance. Conversely, line 120 shows an alternative turbo design with abrupt changes in area ratios, as shown near 90 and 270 degree data points, resulting in less efficient and less smooth exhaust flow. For the gradual change illustrated by line 122, the area ratio may be characterized as an area ratio change of about 8% to about 30% per 30 degrees, between the circumferential positions of 180 to 300 degrees in a clockwise direction. Further, plot 122 of the area ratios, taken at circumferential locations 116 in counterclockwise directions between 60 and 300 degrees, relative to a vertical plane through vertical axis 101 of the turbo casing 56, may vary between about 0.42 and about 1.15.

In one embodiment, turbo casing 56 is disposed downstream from the exhaust diffuser 62, wherein the turbo casing comprises a torus shaped chamber leading to an exhaust outlet 83. As explained above, the torus shaped chamber has a cross-sectional area that progressively increases by at least about 40 percent from about the 180 degrees position to about the 270 degree position in an annular direction toward the exhaust outlet 83. Further, the progressive increase in cross-sectional area is represented by the area ratio plot 122 representing a non-symmetrical torus shaped chamber between about 60 and about 300 degrees relative to a vertical plane centered through vertical axis 101, wherein the area ratio plot 122 varies between about 0.42 and about 1.15.

Figure 8:
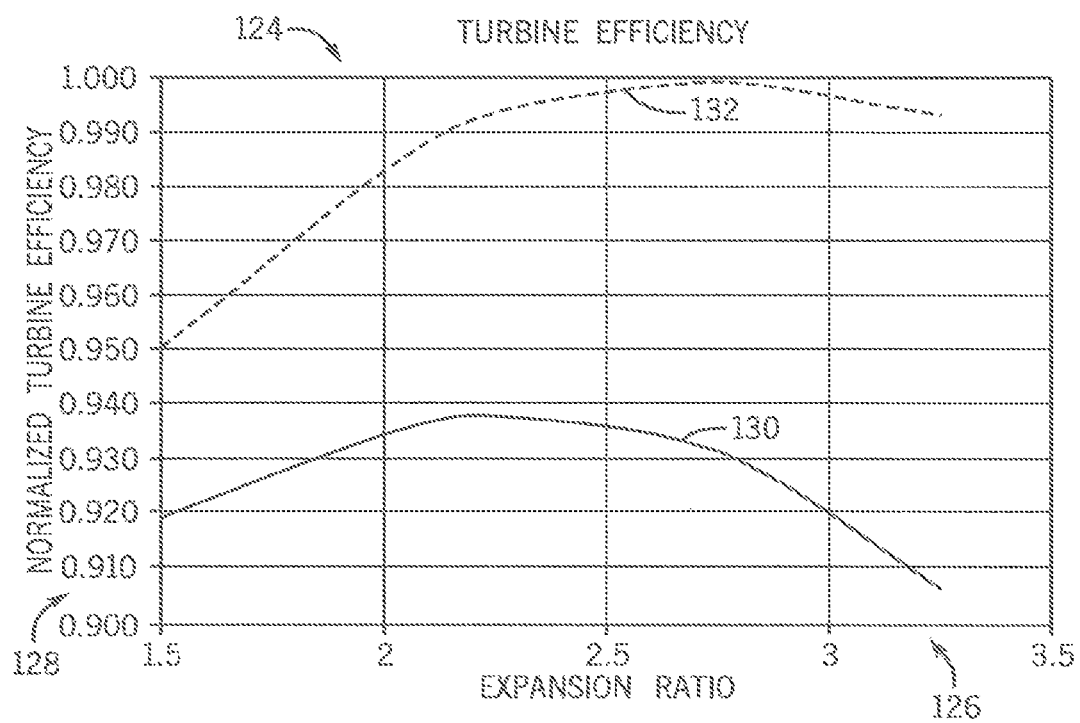
FIG. 8 is a chart of expansion ratio plotted against normalized turbine efficiency for two turbocharger designs.

FIG. 8 is a chart 124 of normalized turbine efficiency 128 plotted against expansion ratio 126 for a turbocharger 12 according to one embodiment of the present disclosure. The expansion ratio may be described as a turbine inlet pressure divided by a turbine exit pressure in absolute terms. With reference to FIG. 3, the expansion ratio measurements may be taken at transition section 72 (turbine inlet pressure) and exhaust outlet 83 (turbine outlet pressure). Expansion ratio 126 is an input to FIG. 8 which can be used to characterize the operation of a turbine, with the benefit being shown on the vertical axis using the normalized turbine efficiency 128. In chart 124, a normalized turbine efficiency 128 is plotted against expansion ratio 126, thereby showing turbocharger 12 performance improvements as discussed above that follow from the configurations and turbo casing geometries disclosed herein. Normalized turbine efficiency 128 is a way to compare the level of actual turbine performance to peak turbine performance at various expansion ratios by dividing the actual turbine efficiency of the turbo design by the peak turbine efficiency of the improved turbo. Data plot 130 illustrates an alternate design of a turbocharger with an exhaust diffuser and turbo casing that do not include the improved configurations, geometries, and components of the present disclosure. In contrast, data plot 132 illustrates the improved turbocharger efficiency achieved by the optimized turbo casing 56 design and exhaust diffuser 62 disclosed herein, along with other turbine stage 50 components.

As depicted, and with reference to the data plot 132 corresponding to the turbocharger 12 of the present disclosure, the peak turbine efficiency of turbocharger 12 occurs at an expansion ratio of about 2.7, which is a normalized turbine efficiency of 1. A comparison of data plots 130 and 132 illustrates that the configurations, geometries, and components of improved turbocharger 12, as discussed above, may result in improved turbine efficiency. Specifically, the gradual geometry changes in turbo casing 56 and improvements in the bell shaped exhaust diffuser 62 provide improved exhaust flow and efficiency through optimized area scheduling within the turbocharger 12. As shown in the chart 124, at low expansion ratios (1.5 for example), the normalized turbine efficiency of the improved turbocharger 12 of the present disclosure is about 3% higher than the efficiency of the alternate turbocharger represented by data plot 130. Further, at higher expansion ratios (3 for example), the normalized turbine efficiency of the improved turbocharger 12 of the present disclosure is about 8% higher than the efficiency of the alternate turbocharger represented by data plot 130.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

As used in the description above, the terms "high" and "low" are relative, meaning that "high" value is a value higher than a "low" value. Conversely, a "low" value is a value lower than a "high" value. References to "one embodiment" or "an embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein."

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbocharger, comprising:
a compressor comprising compressor blades;
a turbine comprising turbine blades;
a shaft coupling the compressor to the turbine;
an exhaust diffuser disposed downstream from the turbine blades, wherein the exhaust diffuser comprises a bell mouth; and
a turbo casing disposed downstream from the exhaust diffuser, wherein the turbo casing comprises a torus-shaped chamber leading to an exhaust outlet disposed on and centered on a second section opposite from a first section, and the torus-shaped chamber has a cross-sectional area that is defined as an area bounded by a first line extending radially from a tip of the bell mouth to a first location along an interior casing wall opposite to the tip, by a portion of a second line extending radially from a leading edge of a bucket base to a second location along the interior casing wall, by a surface of the bell mouth extending between the second line and the tip of the bell mouth, and by a portion of the interior casing wall extending between the first line and the second line, the cross-sectional area of the torus-shaped chamber progressively increasing by at least about 40 percent from a center of the first section in about a first 90 degrees from the center of the first section in an annular direction toward the exhaust outlet in the second section.

2. The turbocharger of claim 1, wherein a diffuser inlet annulus area is defined as a radial bucket height swept annularly along a semicircular travel of one of the turbine blades from a first location at an axial line extending through an axis of the shaft to a second location at the axial line that is about 180 degrees from the first location, wherein the progressive increase in the cross-sectional area of the torus-shaped chamber is represented by an area ratio of the cross-sectional area of the torus-shaped chamber divided by the diffuser inlet annulus area, and the area ratio is taken through planes at circumferential locations in a counterclockwise annular direction between about 60 and about 300 degrees relative to a vertical axis centered through the exhaust outlet in the second section, wherein the area ratio varies between about 0.42 and about 1.15.

3. The turbocharger of claim 1, wherein a length of the bell mouth in an axial direction is defined as a bell mouth axial distance from the tip of the bell mouth to the second line that extends radially from the leading edge of the bucket base, and a radial bucket height is defined as a radial distance between a bucket tip and a distal portion of the bucket base, and a ratio of the length of the bell mouth in the axial direction to the radial bucket height is about 1.4 to about 3.4.

4. The turbocharger of claim 1, wherein the turbo casing expands in volume in a circumferential direction of flow through an annular chamber to the exhaust outlet.

5. The turbocharger of claim 1, wherein an angle of an interior casing wall of the first section of the turbo casing is oriented at about 75 to 80 degrees relative to an axis through the shaft.

6. The turbocharger of claim 1, wherein the bell mouth extends into the torus-shaped chamber of the turbo casing by a bell mouth axial distance from the tip of the bell mouth to the second line, the bell mouth axial distance being substantially constant around a circumference of the bell mouth, and the torus-shaped chamber comprises an axial cavity distance between the second line and an opposing interior casing wall, and a protrusion distance is defined as the axial cavity distance minus the bell mouth axial distance, and wherein the protrusion distance varies between about 30%-50% of the axial cavity distance around the circumference of the bell mouth.

7. The turbocharger of claim 1, further comprising an engine coupled to the turbocharger.

8. The turbocharger of claim 1, wherein the turbine is configured to create a cavity within the turbo casing.

9. The turbocharger of claim 1, wherein the torus-shaped chamber comprises a first radial cavity distance measured between opposing surfaces of an interior casing wall at a first location about 180 degrees from a vertical axis that extends from a center of the shaft through the exhaust outlet, and a second radial cavity distance measured between the opposing surfaces of the interior casing wall at a second location about 90 degrees from the vertical axis, and the first radial cavity distance is less than the second radial cavity distance.

* * * * *